(12) United States Patent
Karaki et al.

(10) Patent No.: US 8,156,914 B2
(45) Date of Patent: Apr. 17, 2012

(54) BALANCER OF ENGINE, ENGINE, AND OUTBOARD MOTOR

(75) Inventors: Nobuaki Karaki, Shizuoka (JP); Junichi Mitani, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 354 days.

(21) Appl. No.: 12/652,051

(22) Filed: Jan. 5, 2010

(65) Prior Publication Data

US 2010/0170467 A1   Jul. 8, 2010

(30) Foreign Application Priority Data

Jan. 7, 2009 (JP) ................ 2009-001692

(51) Int. Cl.
*F02B 75/06* (2006.01)
(52) U.S. Cl. ............... 123/192.2; 123/192.1; 464/180; 74/590; 74/603; 74/604
(58) Field of Classification Search ........... 123/192.1, 123/192.2; 464/180; 74/590, 603, 604
See application file for complete search history.

(56) References Cited

U.S. PATENT DOCUMENTS

| | | | | |
|---|---|---|---|---|
| 3,859,966 A | * | 1/1975 | Braun | 123/46 R |
| 4,940,026 A | * | 7/1990 | Fisher | 123/55.4 |
| 5,401,199 A | | 3/1995 | Shibata | |
| 5,927,242 A | * | 7/1999 | Kollock | 123/192.2 |

FOREIGN PATENT DOCUMENTS

| | | | |
|---|---|---|---|
| DE | 3120190 A1 | * | 5/1982 |
| JP | 06-137162 A | | 5/1994 |
| JP | 2002-021933 A | | 1/2002 |

* cited by examiner

*Primary Examiner* — Noah Kamen
*Assistant Examiner* — Hung Q Nguyen
(74) *Attorney, Agent, or Firm* — Keating & Bennett, LLP

(57) ABSTRACT

A balancer of an engine includes a rod and a balancer piston. A first end portion of the rod includes a joining portion which is arranged to be joined to a crankshaft of the engine at a position that is eccentric relative to a rotation axis of the crankshaft. A second end portion of the rod is arranged to reciprocate inside a cylinder according to a rotation of the crankshaft. The balancer piston is fixed to the second end portion of the rod. The balancer piston is arranged to reciprocate inside the cylinder, while rocking between a contact state in which the balancer piston is in contact with an inner wall surface of the cylinder and a non-contact state in which the balancer piston is separated from the inner wall surface. The balancer piston includes a cylindrical outer peripheral portion that is curved so as to swell toward the inner wall surface. The outer peripheral portion is arranged such that lines of intersection with planes perpendicular or substantially perpendicular to a central axis of the balancer piston define circles. The outer peripheral portion includes a contact start portion which is arranged to come into contact first with the inner wall surface when the balancer piston switches from the non-contact state to the contact state. A distance from a center of a maximum outer diameter circle with the largest radius among the circles to the contact start portion is larger than the radius of the maximum outer diameter circle.

7 Claims, 13 Drawing Sheets

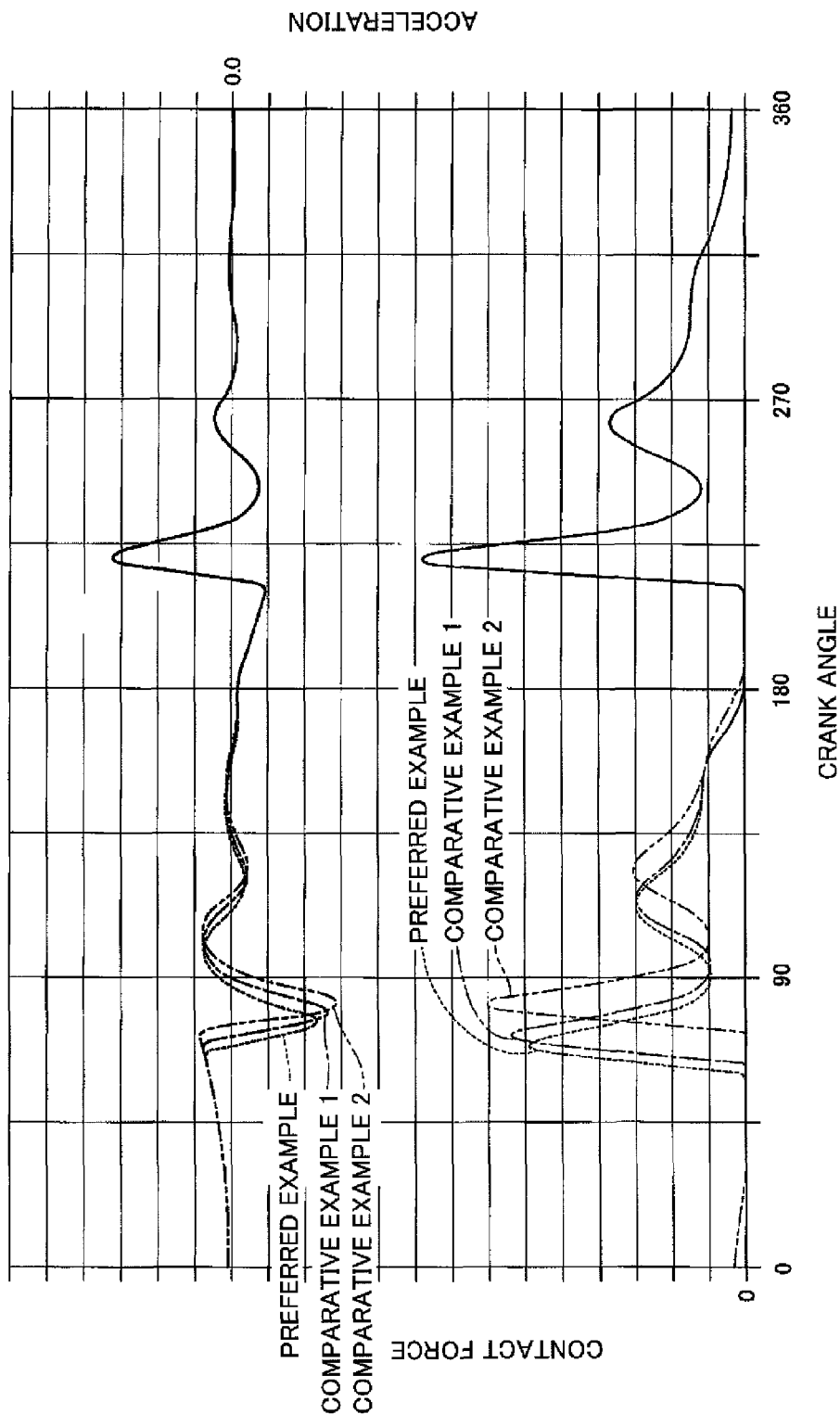

BALANCER OF ENGINE, ENGINE, AND OUTBOARD MOTOR

BACKGROUND OF THE INVENTION

1. Field of the Invention

The present invention relates to a balancer of an engine arranged to reduce vibrations of the engine, an engine including the balancer, and an outboard motor including the engine.

2. Description of the Related Art

An engine according to a prior art is disclosed in Japanese Published Unexamined Patent Application No. 2002-21933. The prior art engine includes a reciprocating balancer piston which reciprocates so as to reduce vibrations caused by reciprocal motion of a drive piston. In detail, the engine includes a drive piston, a balancer piston, a crankshaft to be driven to rotate according to reciprocal motion of the drive piston, and a cylinder having a cylindrical shape which houses the balancer piston and includes an opening provided in an end portion. The engine further includes a rod which is joined to the crankshaft and arranged to reciprocate while rocking according to the rotation of the crankshaft, and a joint pin attached to the balancer piston and the rod from the lateral side. The balancer piston is arranged on the side opposite to the drive piston with respect to the crankshaft. The balancer piston is arranged to pivot around the joint pin with respect to the rod. When the rod reciprocates while rocking according to the rotation of the crankshaft, the balancer piston reciprocates inside the cylinder. Vibrations caused by reciprocal motion of the drive piston are canceled by vibrations caused by reciprocal motion of the balancer piston.

SUMMARY OF THE INVENTION

The inventors of preferred embodiments of the present invention described and claimed in the present application conducted an extensive study and research regarding the balancer of the engine, the engine and the outboard motor, such as the one described above, and in doing so, discovered and first recognized new unique challenges and previously unrecognized possibilities for improvements as described in greater detail below.

That is, an arrangement in which a balancer piston is attached to the rod via a joint pin requires a complicated component arrangement. Further, in the engine according to the prior art described above, the joint pin is attached to the balancer piston and the rod from the lateral side, so that in a state in which the balancer piston is arranged inside the cylinder, it becomes difficult to attach the joint pin. Therefore, installation of the balancer piston is troublesome.

In order to make it easy to install the balancer piston, for example, fixation of the balancer piston to the rod by attaching a screw to the balancer piston and the rod from an end portion of the balancer piston is possible. In this case, even if the balancer piston is arranged inside the cylinder, a screw can be inserted into the cylinder from the opening of the cylinder and attached to the balancer piston and the rod. Therefore, the balancer piston is more easily installed than in the case in which a joint pin is used.

However, the balancer piston fixed to the rod (hereinafter, referred to as "rigid balancer piston") has a fixed piston angle with respect to the rod unlike the balancer piston joined by using a joint pin. Therefore, if the rod tilts with respect to the axis of the cylinder, the rigid balancer piston also tilts with respect to the axis of the cylinder. Therefore, when the rod reciprocates while rocking according to rotation of the crankshaft, the rigid balancer piston reciprocates inside the cylinder while the tilt angle of the rigid balancer piston with respect to the axis of the cylinder changes. At this time, the rigid balancer piston also moves in a direction that is perpendicular or substantially perpendicular to the extending direction of the cylinder. Therefore, the rigid balancer piston reciprocates while repeatedly coming into contact and separating from the inner wall surface of the cylinder. Further, when the clearance between the rigid balancer piston and the inner wall surface of the cylinder is large, the acceleration of the rigid balancer piston in a direction perpendicular or substantially perpendicular to the inner wall surface of the cylinder increases. Therefore, an impact caused when the rigid balancer piston comes into contact with the inner wall surface of the cylinder becomes great, and noise may occur.

In order to overcome the previously unrecognized and unsolved challenges described above, a preferred embodiment of the present invention provides a balancer of an engine including a crankshaft arranged to be driven to rotate by reciprocal motion of a drive piston. The balancer includes a rod and a balancer piston. The rod includes a first end portion and a second end portion. The first end portion includes a joining portion which is arranged to be joined to a crankshaft at a position eccentric from a rotation axis of the crankshaft. The second end portion is arranged to reciprocate inside a cylinder including a cylindrical inner wall surface according to a rotation of the crankshaft. The balancer piston is fixed to the second end portion of the rod. The balancer piston is arranged to reciprocate inside the cylinder so as to reduce vibrations caused by reciprocal motion of the drive piston, while rocking between a contact state in which the balancer piston is in contact with the inner wall surface and a non-contact state in which the balancer piston is separated from the inner wall surface according to the rotation of the crankshaft. The balancer piston includes a cylindrical outer peripheral portion that is curved so as to swell toward the inner wall surface. The outer peripheral portion is arranged such that lines of intersection with planes perpendicular or substantially perpendicular to a central axis of the balancer piston define circles and such that there is a maximum outer diameter circle having a largest radius among the circles. The outer peripheral portion includes a contact portion which is arranged to come into contact with the inner wall surface. The contact portion includes a contact start portion which is arranged to come into contact first with the inner wall surface when the balancer piston switches from the non-contact state to the contact state. A distance from a center of the maximum outer diameter circle to the contact start portion is larger than the radius of the maximum outer diameter circle.

According to this arrangement, the distance from the center of the maximum outer diameter circle to the contact start portion is larger than the radius of the maximum outer diameter circle. Therefore, the distance between the contact start portion and the inner wall surface of the cylinder in a state in which the balancer piston is not in contact with the inner wall surface of the cylinder (non-contact state) becomes shorter than in the case in which the distance from the center of the maximum outer diameter circle to the contact start portion is not more than the radius of the maximum outer diameter circle. Therefore, the transition period from the state in which the balancer piston is not in contact with the inner wall surface of the cylinder (non-contact state) to the state in which the balancer piston is in contact with the inner wall surface of the cylinder (contact state) becomes shorter. In other words, the timing of contact of the balancer piston with the inner wall surface of the cylinder becomes quicker. Therefore, the balancer piston comes into contact with the inner wall surface of the cylinder before the acceleration in a direction perpendicular or substantially perpendicular to the inner wall surface of the cylinder increases when the balancer piston rocks toward the inner wall surface of the cylinder while being accelerated by a force of the rod. Therefore, an impact when the balancer piston comes into contact with the inner wall surface of the cylinder is significantly reduced and minimized. Accordingly, the occurrence of noise is prevented.

The balancer piston may be arranged to assume a tilt position tilting with respect to an axis of the cylinder and a non-tilt position parallel or substantially parallel to the axis of the cylinder when the balancer piston is in the non-contact state. In this case, a minimum clearance between the outer peripheral portion in the tilt position and the inner wall surface of the cylinder may be smaller than a minimum clearance between the outer peripheral portion in the non-tilt position and the inner wall surface of the cylinder.

Also, at least, the contact start portion and the vicinity thereof may have a curved surface shape protruding to the inner wall surface side.

Also, the contact portion may be arranged to change a portion which comes into contact with the inner wall surface of the cylinder according to the tilt angle of the balancer piston, and slide on the inner wall surface of the cylinder in the contact state. In this case, a surface of the contact portion may have a curved surface including an arc with a predetermined radius of curvature larger than the radius of the maximum outer diameter circle in a section including the axis of the cylinder.

Also, an entire surface of the outer peripheral portion may be a curved surface including an arc with the predetermined radius of curvature in a section including the axis of the cylinder.

Also, another preferred embodiment of the present invention provides an engine including a crankshaft, a drive piston, a rod, and a balancer piston. The drive piston is arranged to reciprocate inside a first cylinder, and to drive and rotate the crankshaft. The rod includes a first end portion and a second end portion. The first end portion includes a joining portion arranged to be joined to the crankshaft at a position eccentric from a rotation axis of the crankshaft. The second end portion is arranged to reciprocate inside a second cylinder including a cylindrical inner wall surface according to a rotation of the crankshaft. The balancer piston is fixed to the second end portion of the rod. The balancer piston is arranged to reciprocate inside the second cylinder so as to reduce vibrations caused by reciprocal motion of the drive piston, while rocking between a contact state in which the balancer piston comes into contact with the inner wall surface and a non-contact state in which the balancer piston is separated from the inner wall surface according to the rotation of the crankshaft. The balancer piston includes a cylindrical outer peripheral portion that is curved so as to swell toward the inner wall surface. The outer peripheral portion is arranged such that lines of intersection with planes perpendicular or substantially perpendicular to a central axis of the balancer piston define circles and such that there is a maximum outer diameter circle having a largest radius among the circles. The outer peripheral portion includes a contact portion which is arranged to come into contact with the inner wall surface. The contact portion includes a contact start portion which is arranged to come into contact first with the inner wall surface when the balancer piston switches from the non-contact state to the contact state. A distance from a center of the maximum outer diameter circle to the contact start portion is larger than the radius of the maximum outer diameter circle.

Still another preferred embodiment of the present invention provides an outboard motor arranged to rotate a propeller by a driving force of an engine. The engine includes a crankshaft, a drive piston, a rod, and a balancer piston. The drive piston is arranged to reciprocate inside a first cylinder, and drive and rotate a crankshaft. The rod includes a first end portion and a second end portion. The first end portion includes a joining portion arranged to be joined to the crankshaft at a position eccentric from a rotation axis of the crankshaft. The second end portion is arranged to reciprocate inside a second cylinder including a cylindrical inner wall surface according to a rotation of the crankshaft. The balancer piston is fixed to the second end portion of the rod. The balancer piston is arranged to reciprocate inside the second cylinder so as to reduce vibrations caused by reciprocal motion of the drive piston, while rocking between a contact state in which the balancer piston comes into contact with the inner wall surface and a non-contact state in which the balancer piston is separated from the inner wall surface according to the rotation of the crankshaft. The balancer piston includes a cylindrical outer peripheral portion that is curved so as to swell toward the inner wall surface. The outer peripheral portion is arranged such that lines of intersection with planes perpendicular or substantially perpendicular to a central axis of the balancer piston define circles and such that there is a maximum outer diameter circle having a largest radius among the circles. The outer peripheral portion includes a contact portion which is arranged to come into contact with the inner wall surface. The contact portion includes a contact start portion which is arranged to come into contact first with the inner wall surface when the balancer piston switches from the non-contact state to the contact state. A distance from a center of the maximum outer diameter circle to the contact start portion is larger than the radius of the maximum outer diameter circle.

Other elements, features, steps, characteristics and advantages of the present invention will become more apparent from the following detailed description of the preferred embodiments with reference to the attached drawings.

BRIEF DESCRIPTION OF THE DRAWINGS

FIG. 17 is a view showing results of analysis for describing influence of the shape of the contact portion of the balancer piston on the acceleration and contact force of the balancer piston.

DETAILED DESCRIPTION OF PREFERRED EMBODIMENTS

Figure 1:
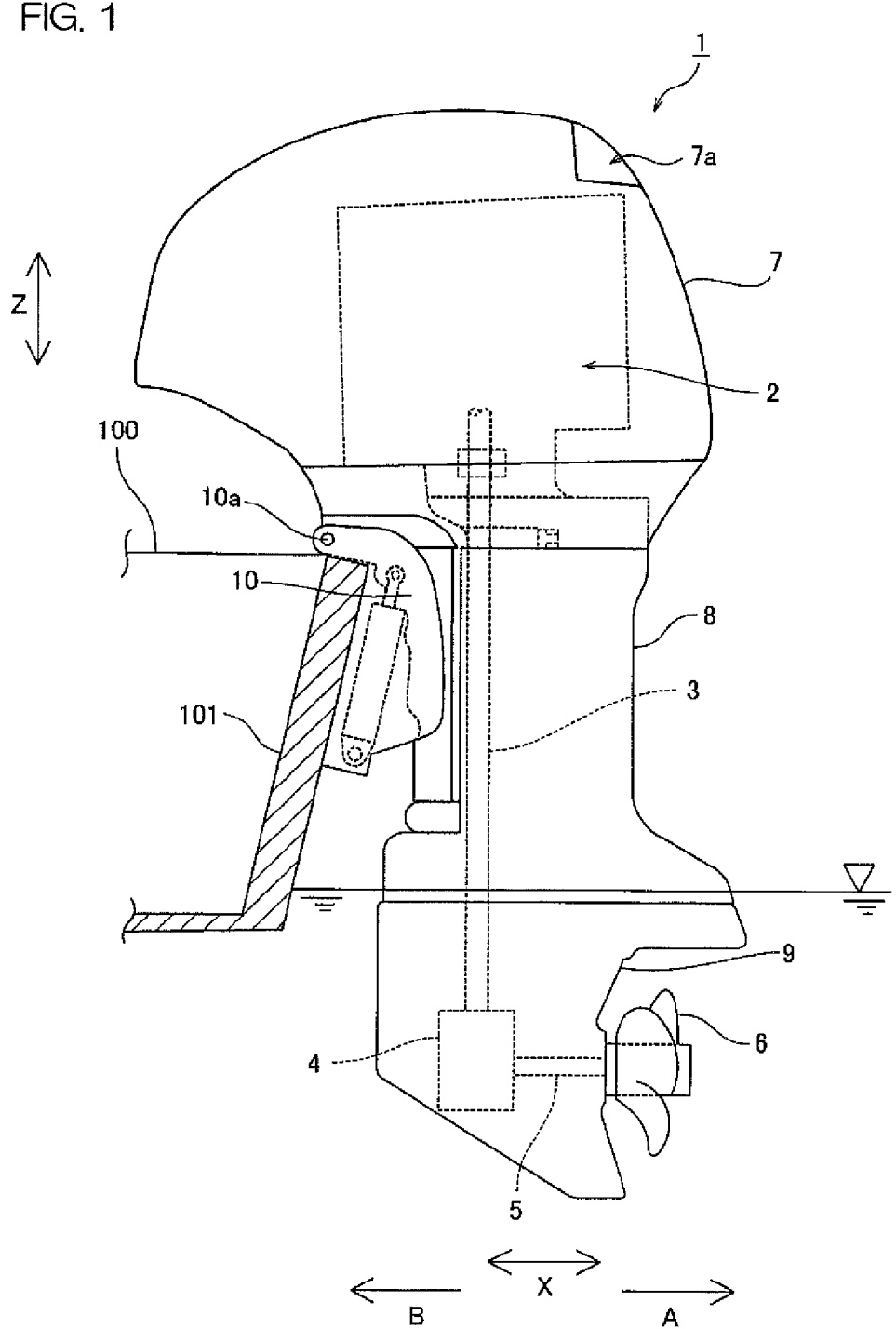
FIG. 1 is a side view showing an outboard motor according to a preferred embodiment of the present invention.

FIG. 1 is a side view showing an outboard motor 1 according to a preferred embodiment of the present invention.

The outboard motor 1 includes an engine 2, a drive shaft 3, a forward-reverse switching mechanism 4, a propeller shaft 5, and a propeller 6. The engine 2 is housed inside the engine cover 7. The drive shaft 3, the forward-reverse switching mechanism 4, and the propeller shaft 5 are housed in an upper case 8 and a lower case 9 arranged below the engine cover 7. The drive shaft 3 is arranged to extend in a vertical direction (Z direction). Also, the propeller shaft 5 is arranged to extend in the horizontal direction. The forward-reverse switching mechanism 4 is connected to the lower end portion of the drive shaft 3. Also, the forward-reverse switching mechanism 4 is connected to the front end portion of the propeller shaft 5. The propeller 6 is attached to the rear end portion of the propeller shaft 5. A driving force of the engine 2 is transmitted to the propeller 6 via the drive shaft 3, the forward-reverse switching mechanism 4, and the propeller shaft 5. The rotation direction of the propeller 6 is switched by the forward-reverse switching mechanism 4.

Also, the outboard motor 1 is attached to a transom 101 provided at a rear portion of a hull 100 via a clamp bracket 10. The clamp bracket 10 includes a tilt shaft 10a arranged to extend in the horizontal direction. The outboard motor 1 is arranged to rock up and down with respect to the hull 100 around the tilt shaft 10a. The hull 100 is propelled in a forward drive direction (arrow B direction) or a reverse drive direction (arrow A direction) when the propeller 6 is rotated by a driving force of the engine 2. Also, air to be supplied into the engine 2 is suctioned into the inside of the engine cover 7 via a vent hole 7a provided in a side portion of the engine cover 7 and taken into the engine 2.

Figure 2:
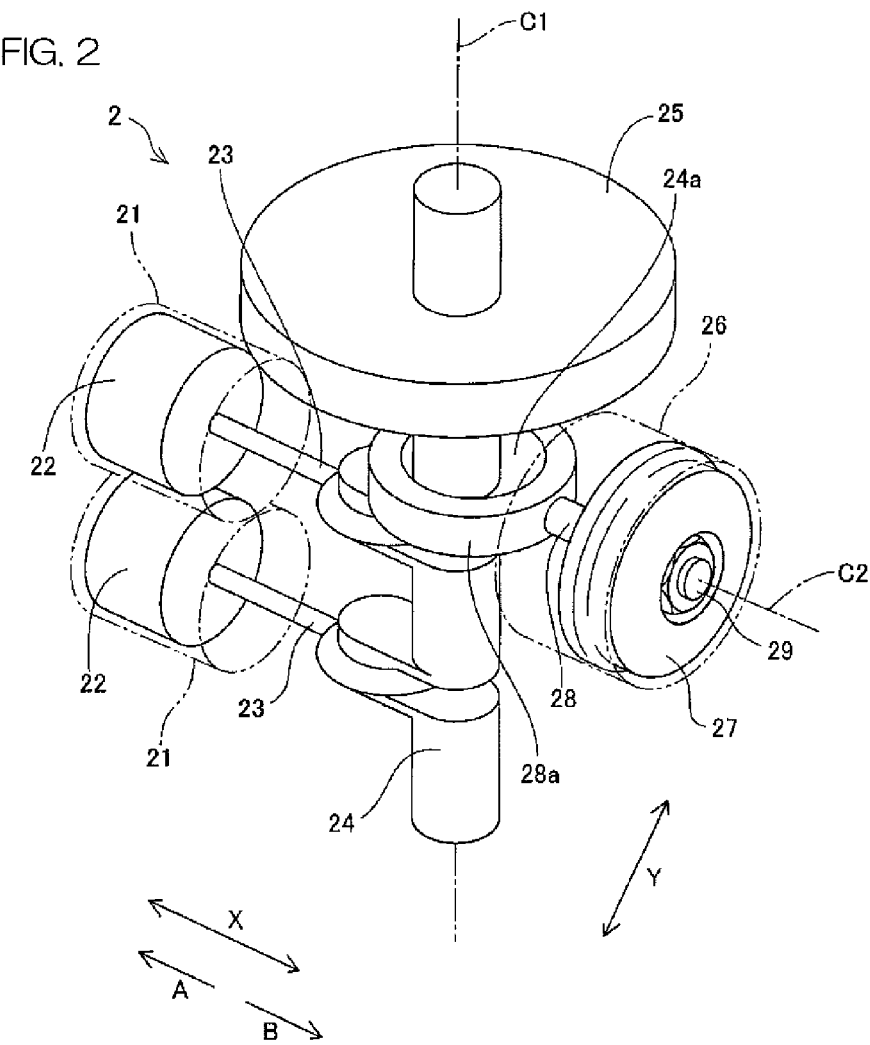
FIG. 2 is a schematic perspective view showing a portion of the engine installed in an outboard motor according to a preferred embodiment of the present invention.

FIG. 2 is a schematic perspective view showing a portion of the engine 2 installed in the outboard motor 1 according to a preferred embodiment of the present invention.

The engine 2 preferably is, for example, a two-cylinder, four-cycle engine. The engine 2 includes a crankshaft 24 arranged to extend up and down, two first cylinders 21, two drive pistons 22, one second cylinder 26, and one balancer piston 27. Each first cylinder 21 is an example of "a first cylinder" according to a preferred embodiment of the present invention. Also, the second cylinder 26 is an example of "a second cylinder" according to a preferred embodiment of the present invention. The first cylinders 21 and the second cylinder 26 are arranged to extend horizontally, respectively. Also, the two first cylinders 21 and the second cylinder 26 are arranged at the sides opposite to each other with respect to the crankshaft 24. Each drive piston 22 is arranged inside a corresponding first cylinder 21. Also, the balancer piston 27 is arranged inside the second cylinder 26.

The crankshaft 24 is joined to first end portions of con rods 23. Also, the drive pistons 22 are joined to second end portions of the con rods 23 via pins 22a (see FIG. 3). Therefore, the drive pistons 22 are joined to the crankshaft 24 via the con rods 23. The drive pistons 22 are arranged to reciprocate inside the first cylinders 21 when an air-fuel mixture is burned at a predetermined timing inside the first cylinders 21. The reciprocal motions of the drive pistons 22 are converted into rotation of the crankshaft 24 around the rotation axis C1 by the con rods 23. Also, a flywheel 25 arranged to smooth the rotation of the crankshaft 24 is fixed to the upper end portion of the crankshaft 24.

Figure 3:
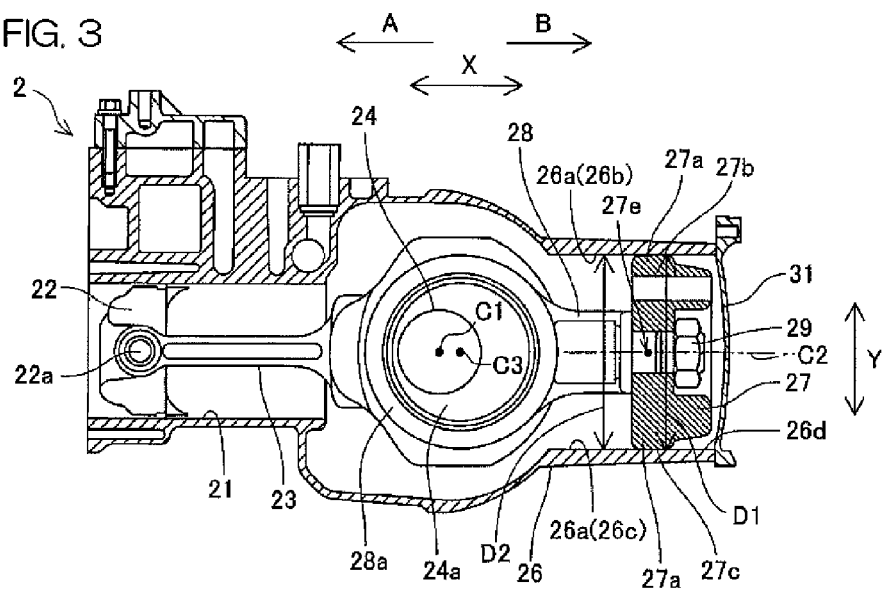
FIG. 3 is a transverse sectional view showing a portion of the engine installed in an outboard motor according to a preferred embodiment of the present invention.
Figure 4:
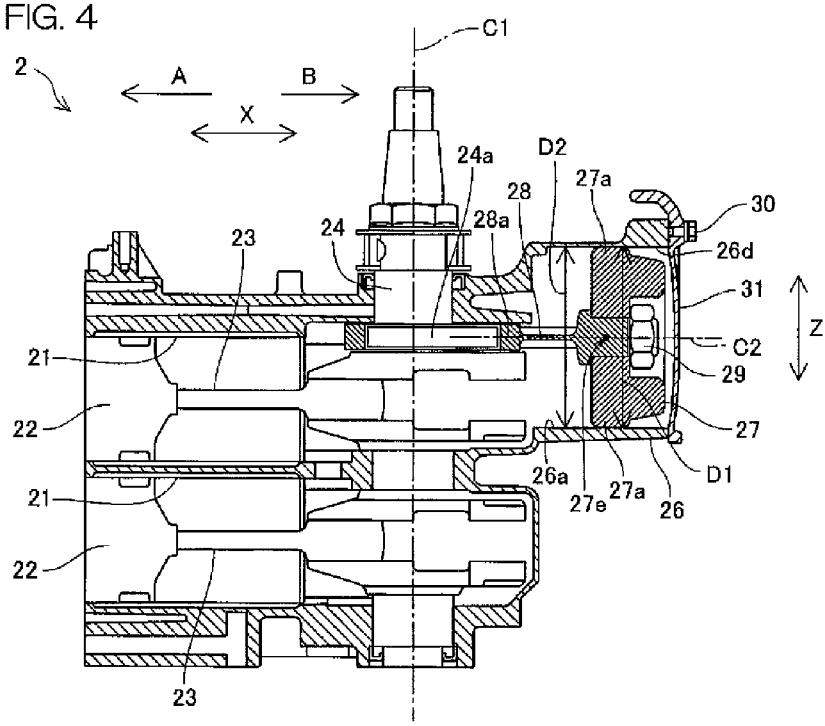
FIG. 4 is a longitudinal sectional view showing a portion of the engine installed in an outboard motor according to a preferred embodiment of the present invention.

FIG. 3 is a transverse sectional view showing a portion of the engine 2 installed in the outboard motor 1 according to a preferred embodiment of the present invention. Also, FIG. 4 is a longitudinal sectional view showing a portion of the engine 2 installed in the outboard motor 1 according to a preferred embodiment of the present invention.

As shown in FIG. 3, the crankshaft 24 includes a disk-shaped engagement portion 24a that is eccentric relative to the rotation axis C1 of the crankshaft 24. The center (point C3) of the engagement portion 24a of the crankshaft 24 is arranged at a position different from the rotation axis C1 of the crankshaft 24. The engagement portion 24a of the crankshaft 24 is fitted to the inner periphery of an engagement portion 28a provided on a first end portion of a rod 28. The engagement portion 28a of the rod 28 is an example of "a joining portion" according to a preferred embodiment of the present invention. The engagement portion 24a of the crankshaft 24 has an outer diameter substantially equal to the inner diameter of the engagement portion 28a of the rod 28.

Also, the second cylinder 26 includes a cylindrical inner wall surface 26a. The second cylinder 26 includes an opening 26d provided at an end portion on the side opposite to the crankshaft 24. The opening 26d is covered by a cover member 31 fixed to the second cylinder 26 by a screw 30 (see FIG. 4). Also, the balancer piston 27 is installed inside the second cylinder 26 from the opening 26d. The balancer piston 27 is fixed to the second end portion of the rod 28 by a nut 29. Therefore, the balancer piston 27 is joined to the crankshaft 24 via the rod 28.

The rotation of the crankshaft 24 is converted into reciprocal motion of the balancer piston 27 in the X direction by the engagement portion 24a of the crankshaft 24 and the engagement portion 28a of the rod 28. Also, the rod 28 reciprocates in the X direction while rocking within the XY plane around the second end portion (end portion on the side opposite to the crankshaft 24) of the rod 28 according to the rotation of the crankshaft 24. Therefore, the balancer piston 27 fixed to the second end portion of the rod 28 reciprocates in the X direction while rocking inside the second cylinder 26 according to the rotation of the crankshaft 24. Accordingly, the balancer piston 27 reciprocates inside the second cylinder 26 while alternately assuming a contact state in which the balancer piston is in partial contact with the inner wall surface 26a of the second cylinder 26 and a non-contact state in which the balancer piston is not in contact with the inner wall surface 26a of the second cylinder 26 according to the rotation of the crankshaft 24.

The balancer piston 27 includes an outer peripheral portion 27a arranged to slide on the inner wall surface 26a of the second cylinder 26 when the balancer piston 27 reciprocates. The outer peripheral portion 27a is an example of "an outer peripheral portion" according to a preferred embodiment of the present invention. The outer peripheral portion 27a has a tubular shape that is curved so as to swell toward the inner wall surface 26a of the second cylinder 26 (for example, refer to FIG. 6). The outer peripheral portion 27a is arranged such that lines of intersection with planes perpendicular or substantially perpendicular to the central axis C2 of the balancer piston 27 define circles. The outer peripheral portion 27a has a substantially cylindrical outer peripheral surface along the inner wall surface 26a of the second cylinder 26. The outer diameter D1 (maximum outer diameter) of the outer peripheral portion 27a is slightly smaller than the inner diameter D2 of the inner wall surface 26a of the second cylinder 26.

Also, the first end portion of the rod 28 is an end portion on the crankshaft 24 side. Also, the second end portion of the rod 28 is an end portion on the side opposite to the crankshaft 24. Similarly, the first end portion of each con rod 23 is an end portion on the crankshaft 24 side. Also, the second end portion of each con rod 23 is an end portion on the side opposite to the crankshaft 24. A total of rotating masses of the crankshaft 24, the first end portion of the rod 28, and the first end portions of the two con rods 23 is well-balanced with a total of reciprocating masses of the two drive pistons 22, the second end portions of the two con rods 23, the balancer piston 27, and the second end portions of the rod 28. In other words, the engine 2 is arranged not to cause an inertial force in the crankshaft 24.

Also, the total of reciprocating masses of the two drive pistons 22 and the second end portions of the two con rods 23 is canceled by the total of reciprocating masses of the balancer piston 27 and the second end portions of the rod 28. In other words, the engine 2 is arranged such that the inertial force of the piston 22 is minimized. The balancer of the engine 2 includes the balancer piston 27, the rod 28, and the nut 29. The balancer of the engine 2 is an example of "a balancer of an engine" according to a preferred embodiment of the present invention.

Figure 5:
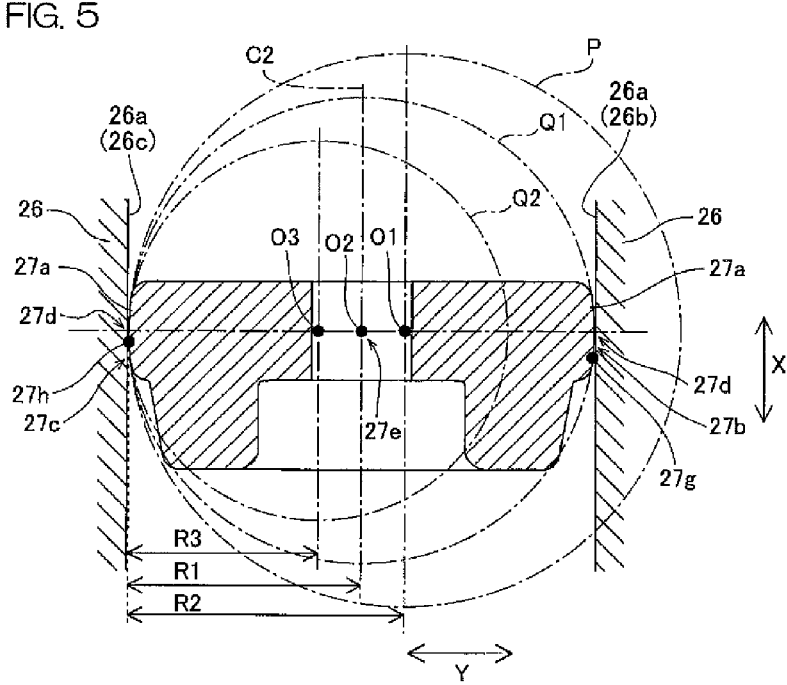
FIG. 5 is a sectional view when a balancer piston according to a preferred embodiment of the present invention assumes a non-tilt position not tilting with respect to the axis of a second cylinder in the no-contact state.

FIG. 5 is a sectional view when the balancer piston 27 according to a preferred embodiment of the present invention assumes a non-tilt position not tilting with respect to the axis of the second cylinder 26 in the non-contact state. In FIG. 5, the axis of the second cylinder 26 matches the central axis C2 of the balancer piston 27.

As described above, the engine 2 preferably is a four-cycle engine, for example. The crankshaft 24 makes two rotations during four steps of suction, compression, explosion, and exhaustion. That is, the crank angle of the crankshaft 24 increases from 0 degrees to 720 degrees during the four steps. Also, when the crank angle is 0 degrees, 360 degrees, and 720 degrees, the balancer piston 27 is positioned at the top dead center. When the crank angle is 180 degrees and 540 degrees, the balancer piston 27 is positioned at the bottom dead center. The path from the top dead center to the bottom dead center is a forward path of the balancer piston 27. Also, the path from the bottom dead center to the top dead center is a return path of the balancer piston 27.

When the balancer piston 27 reciprocates inside the second cylinder 26, the tilt angle of the balancer piston 27 with respect to the axis of the second cylinder 26 constantly fluctuates. The balancer piston 27 alternately collides with the right portion (right wall surface 26b) and the left portion (left wall surface 26c) of the inner wall surface 26a in FIG. 5 while reciprocating inside the second cylinder 26. In the forward path, the balancer piston 27 comes into contact with the right wall surface 26b while tilting at a substantially fixed tilt angle. Similarly, the balancer piston 27 comes into contact with the left wall surface 26c while tilting at a substantially fixed tilt angle in the return path. The tilt angle of the balancer piston 27, when it comes into contact with the left wall surface 26c in the return path, is smaller than the tilt angle of the balancer piston 27 when it comes into contact with the right wall surface 26b in the return path.

The right portion (right contact portion 27b) of the outer peripheral portion 27a in FIG. 5 comes into contact with and slides on the right wall surface 26b in the forward path. Also, the left portion (left contact portion 27c) of the outer peripheral portion 27a in FIG. 5 comes into contact with and slides on the left wall surface 26c in the return path. The right contact portion 27b and the left contact portion 27c are an example of "a contact portion" according to a preferred embodiment of the present invention. When the right contact portion 27b is in contact with the right wall surface 26b, the left contact portion 27c and the left wall surface 26c are separated from each other. Also, when the left contact portion 27c is in contact with the left wall surface 26c, the right contact portion 27b and the right wall surface 26b are separated from each other.

Also, the surface of the outer peripheral portion 27a is arranged such that the central portion in the axial direction of the outer peripheral portion 27a swells outward the most. The portion swelling outward the most of the surface of the outer peripheral portion 27a is a maximum outer diameter portion 27d. The maximum outer diameter portion 27d in the non-tilt position is positioned on the side closest to the inner wall surface 26a of the second cylinder 26. The maximum outer diameter portion 27d is a maximum outer diameter circle with the largest radius among the circles of the lines of intersection of planes perpendicular or substantially perpendicular to the central axis C2 of the balancer piston 27 with the surface of the outer peripheral portion 27a. The center point 27e of the maximum outer diameter portion 27d is positioned on the central axis C2. The right contact portion 27b and the left contact portion 27c are portions on the side opposite to the crankshaft 24 of the maximum outer diameter portion 27d of the surface of the outer peripheral portion 27a. That is, in FIG. 5, the right contact portion 27b and the left contact portion 27c are portions lower than the maximum outer diameter portion 27d of the surface of the outer peripheral portion 27a.

The surface of the outer peripheral portion 27a has a shape along an arc with a predetermined radius of curvature. In detail, the surface of the outer peripheral portion 27a has a shape along a circle P with a radius of curvature R2 larger than the radius R1 (distance from the center point 27e to the maximum outer diameter portion 27d) of the maximum outer diameter portion 27d. The center O1 of the circle P is positioned on the straight line connecting the maximum outer diameter portion 27d and the center point 27e. The distance from the surface of the outer peripheral portion 27a except for the maximum outer diameter portion 27d to the center point 27e is larger than the distance (radius) R1 from the center point 27e to the maximum outer diameter portion 27d.

The portion which comes into contact first with the inner wall surface 26a of the second cylinder 26 of the surface of the outer peripheral portion 27a is the portion except for the maximum outer diameter portion 27d. The outer peripheral portion 27a includes a right contact start portion 27g which comes into contact first with the inner wall surface 26a of the second cylinder 26 of the right contact portion 27b, and a left contact start portion 27h which comes into contact first with the inner wall surface 26a of the second cylinder 26 of the left contact portion 27c. The balancer piston 27 starts to slide on the inner wall surface 26a of the second cylinder 26 while the right contact start portion 27g or the left contact start portion 27h is in contact with the inner wall surface 26a of the second cylinder 26. The distance from the right contact start portion 27g and the left contact start portion 27h to the center point 27e is larger than the radius R1.

Figure 6:
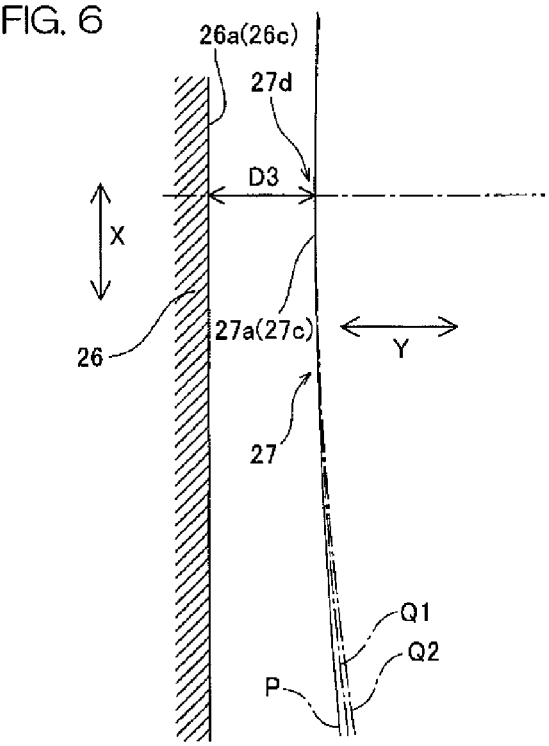
FIG. 6 is a partial enlarged view of FIG. 5.
Figure 7:
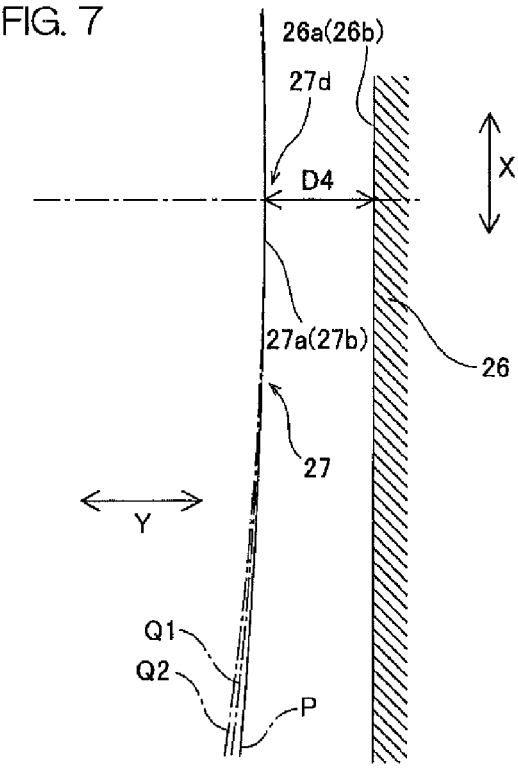
FIG. 7 is a partial enlarged view of FIG. 5.

FIG. 6 and FIG. 7 are enlarged views of portions of FIG. 5. Hereinafter, with reference to FIG. 6 and FIG. 7, the clearance between the balancer piston 27 and the second cylinder 26 when the balancer piston 27 assumes the non-tilt position will be described. The non-tilt position is a position of the balancer piston 27 when it is not tilting with respect to the axis of the second cylinder 26 in a state in which the balancer piston 27 is not in contact with the inner wall surface 26a of the second cylinder 26.

As shown in FIG. 6, a minimum clearance between the left contact portion 27c and the left wall surface 26c when the balancer piston 27 assumes the non-tilt position (the clearance between the maximum outer diameter portion 27d and the left wall surface 26c) is D3. As shown in FIG. 7, a minimum clearance between the right contact portion 27b and the right wall surface 26b when the balancer piston 27 assumes the non-tilt position (the clearance between the maximum outer diameter portion 27d and the right wall surface 26b) is D4. Therefore, the minimum clearance between the balancer piston 27 and the inner wall surface 26a of the second cylinder 26 when the balancer piston 27 assumes the non-tilt position is a sum of D3 and D4.

Figure 8:
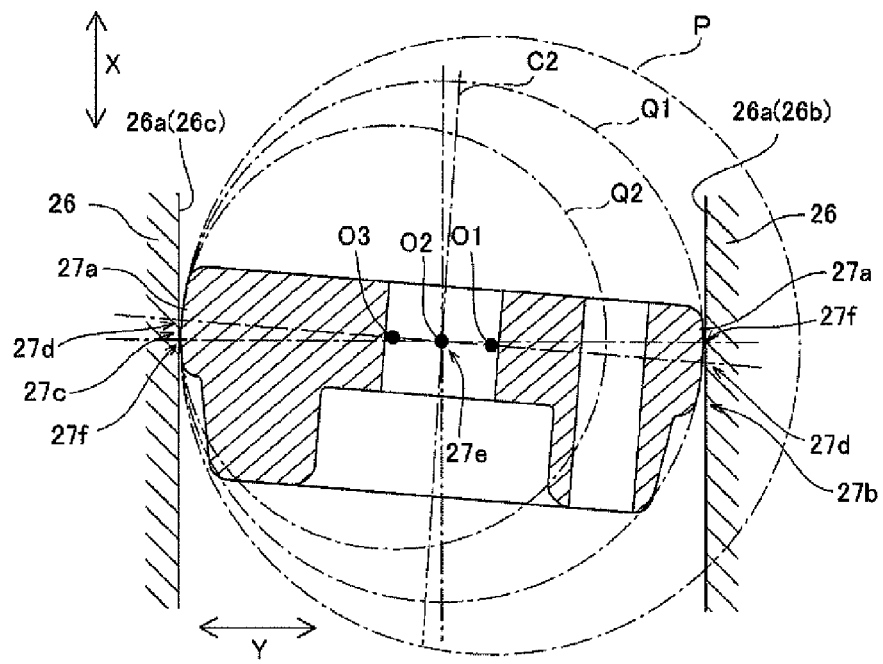
FIG. 8 is a sectional view when a balancer piston according to a preferred embodiment of the present invention assumes a tilt position tilting with respect to the axis of a second cylinder in the non-contact state.
Figure 9:
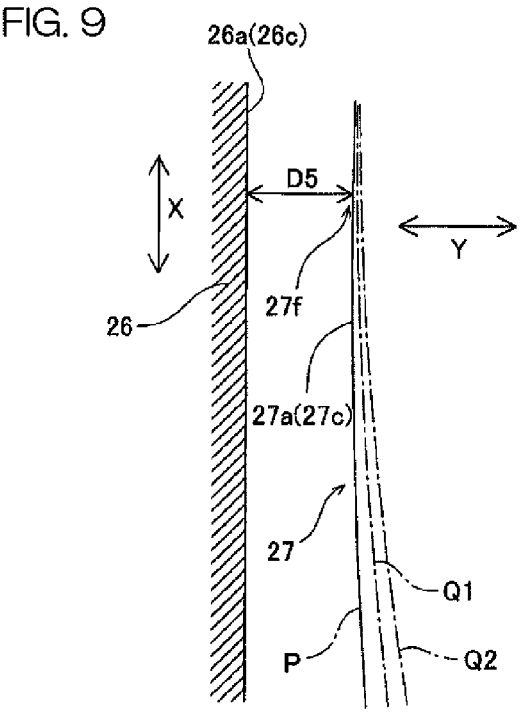
FIG. 9 is a partial enlarged view of FIG. 8.
Figure 10:
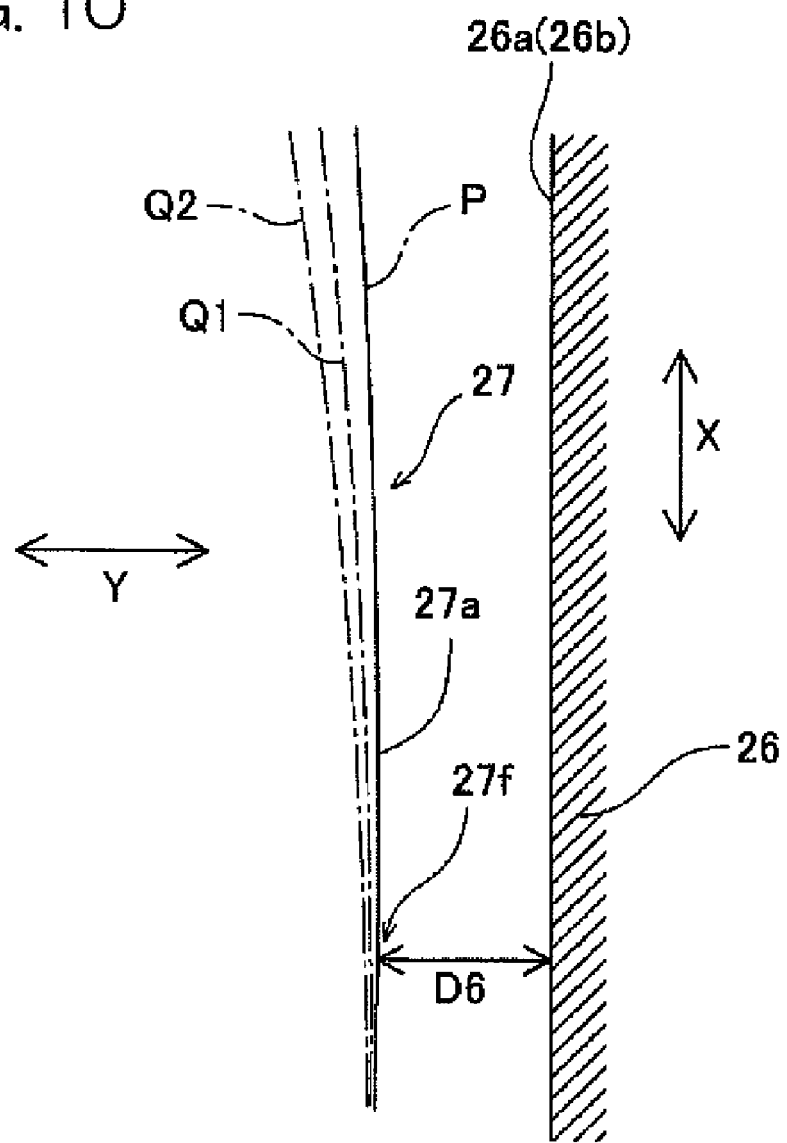
FIG. 10 is a partial enlarged view of FIG. 8.

FIG. 8 is a sectional view when the balancer piston 27 according to a preferred embodiment of the present invention assumes a tilt position tilting with respect to the axis of the second cylinder 26 in the non-contact state. FIG. 9 and FIG. 10 are enlarged views of portions of FIG. 8.

As shown in FIG. 8, the left contact portion 27c and the right contact portion 27b include proximal portions 27f, respectively. As shown in FIG. 9, the proximal portion 27f of the left contact portion 27c becomes closest to the left wall surface 26c of the second cylinder 26 when the balancer piston 27 assumes a tilt position. The clearance between the proximal portion 27f of the left contact portion 27c when the balancer piston 27 assumes the tilt position and the left wall surface 26c of the second cylinder 26 (minimum clearance) is D5. As shown in FIG. 10, the proximal portion 27f of the right contact portion 27b becomes closest to the right wall surface 26b of the second cylinder 26 when the balancer piston 27 assumes the tilt position. The clearance between the proximal portion 27f of the right contact portion 27b when the balancer piston 27 assumes the tilt position and the right wall surface 26b of the second cylinder 26 (minimum clearance) is D6. Therefore, the minimum clearance between the balancer piston 27 and the inner wall surface 26a of the second cylinder 26 when the balancer piston 27 assumes the tilt position is a sum of D5 and D6.

The sum of D5 and D6 is smaller than the sum of D3 and D4. That is, the minimum clearance (D5+D6) between the balancer piston 27 in the tilt position and the inner wall surface 26a of the second cylinder 26 is smaller than the minimum clearance (D3+D4) between the balancer piston 27 in the non-tilt position and the inner wall surface 26a of the second cylinder 26. The tilt angle of the balancer piston 27 changes as required during reciprocal motion. Therefore, the size of the minimum clearance (D5+D6) in the tilt position changes as required when the balancer piston 27 reciprocates.

The minimum clearance (D5+D6) in the tilt position is set so as to always be smaller than the minimum clearance (D3+D4) in the non-tilt position.

Next, motion of the balancer piston 27 will be described.

Figure 11:
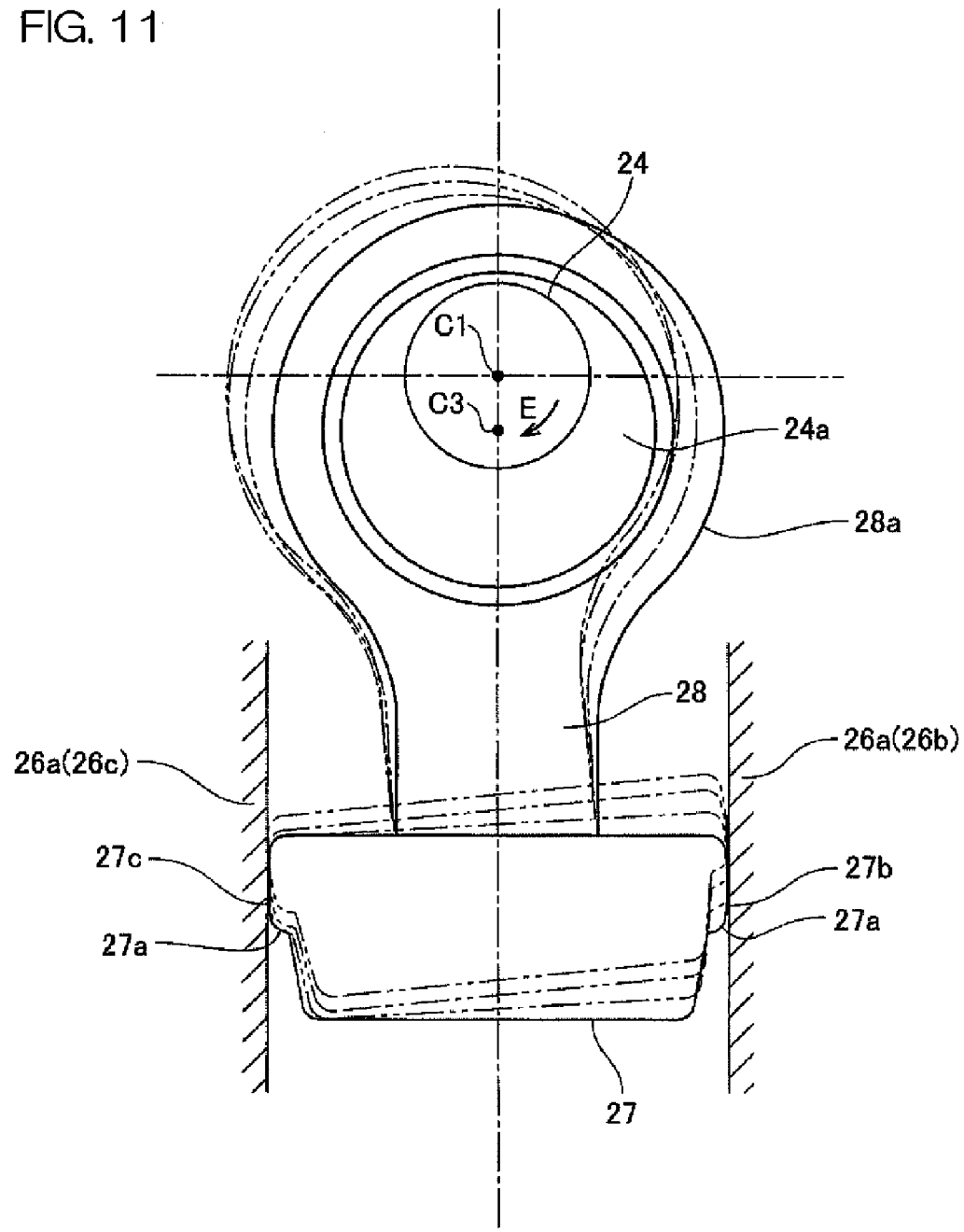
FIG. 11 is a schematic view showing displacement in a forward path of a balancer piston according to a preferred embodiment of the present invention.
Figure 12:
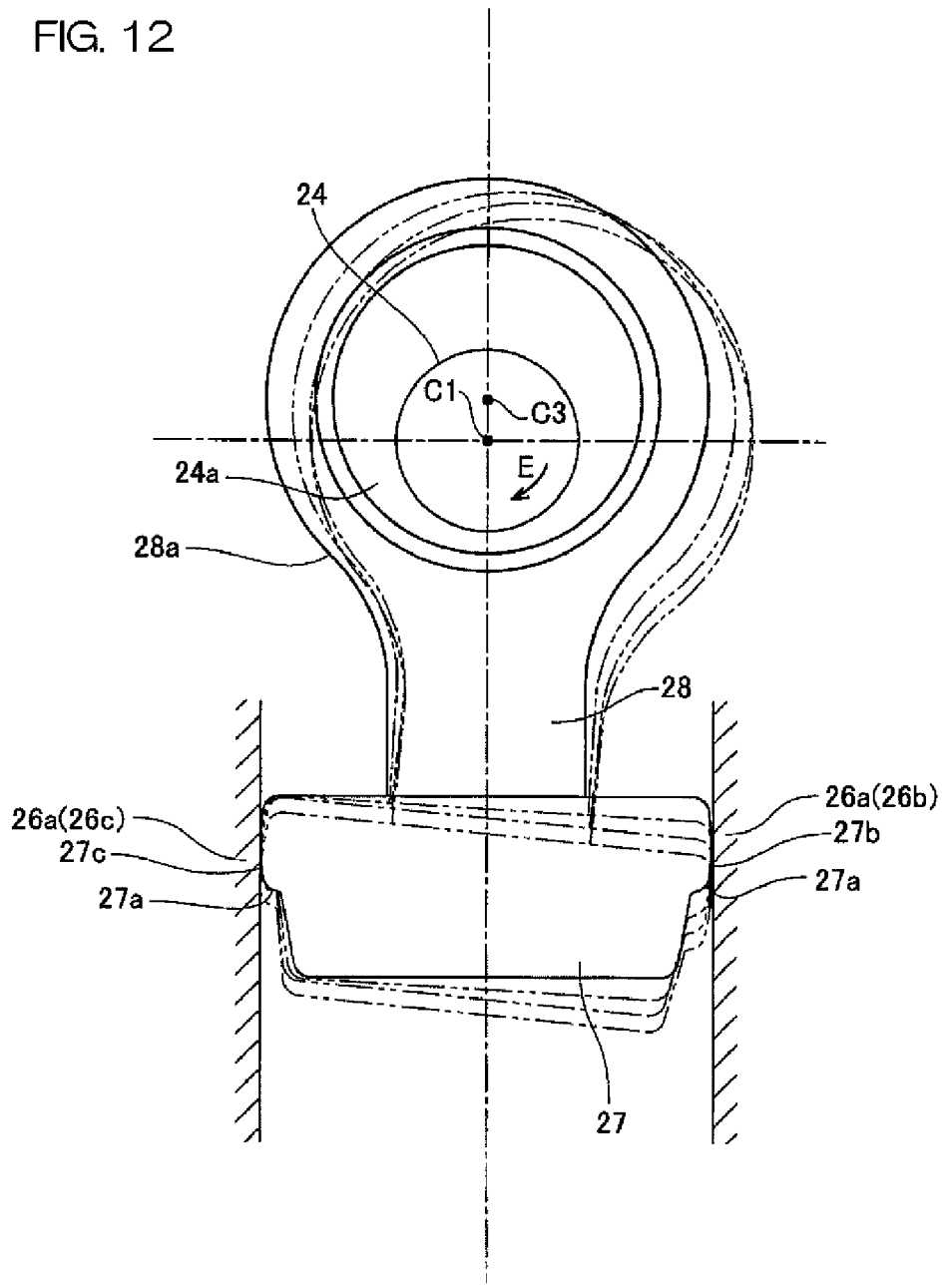
FIG. 12 is a schematic view showing displacement in a return path of a balancer piston according to a preferred embodiment of the present invention.
Figure 13:
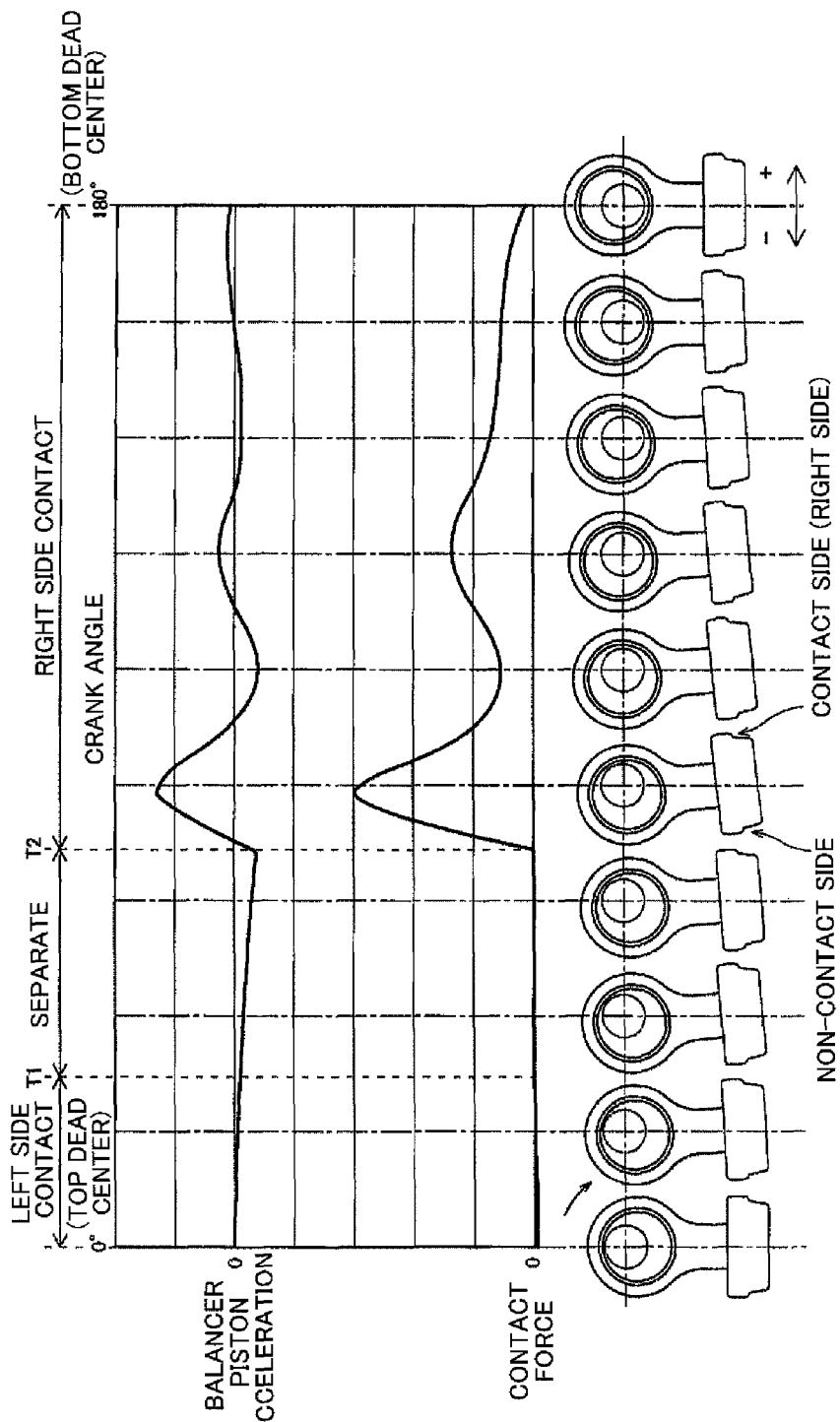
FIG. 13 is a schematic view showing a relationship between displacement in a forward path of a balancer piston according to a preferred embodiment of the present invention and acceleration and a contact force of the balancer piston.
Figure 14:
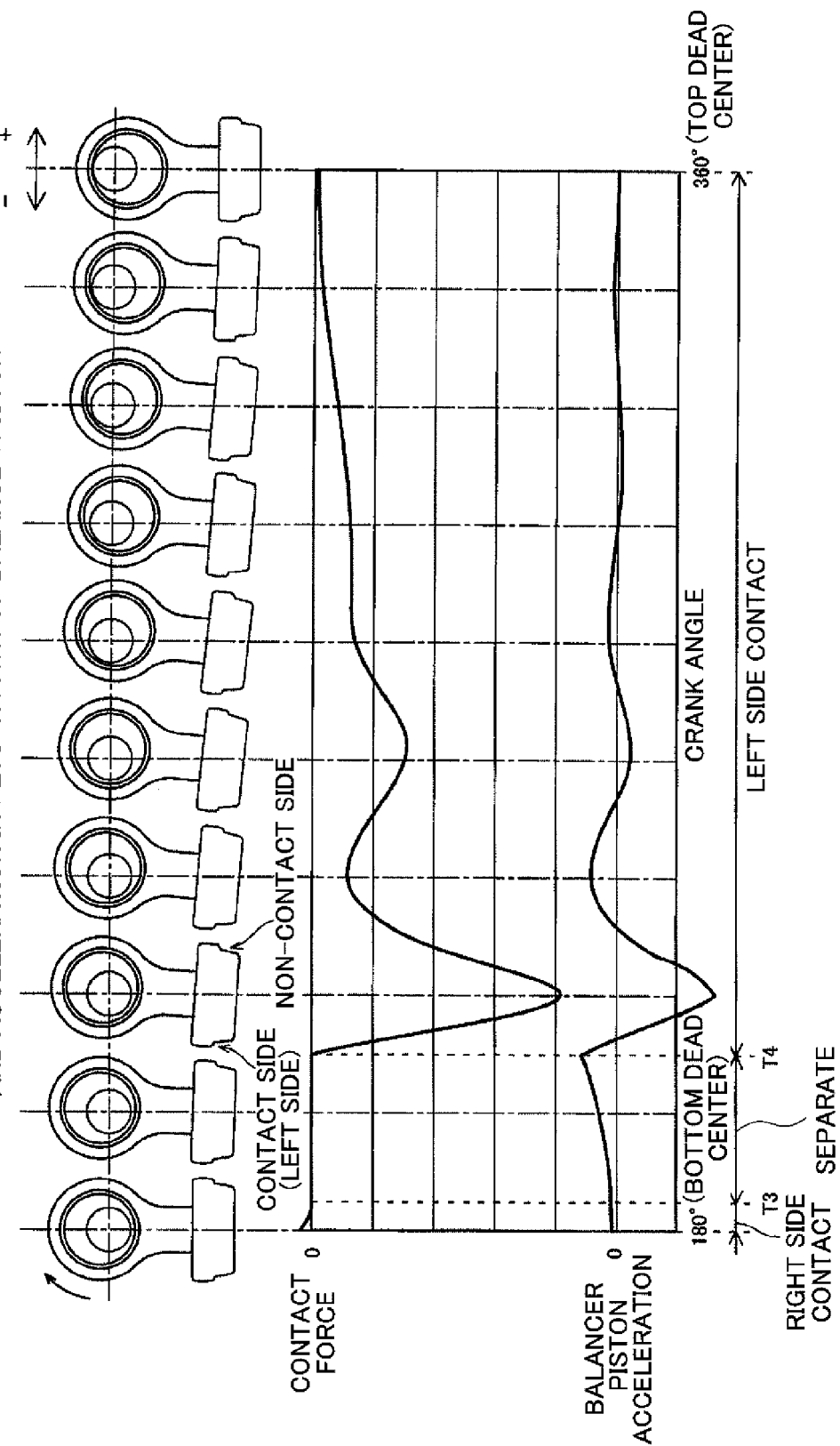
FIG. 14 is a schematic view showing a relationship between displacement in a return path of a balancer piston according to a preferred embodiment of the present invention and acceleration and a contact force of the balancer piston.

FIG. 11 is a schematic view showing displacement in a forward path of the balancer piston 27 according to a preferred embodiment of the present invention. FIG. 12 is a schematic view showing displacement in the return path of the balancer piston 27 according to a preferred embodiment of the present invention. FIG. 13 is a schematic view showing the relationship between displacement in the forward path of the balancer piston 27 according to a preferred embodiment of the present invention and the acceleration and contact force of the balancer piston 27. Also, FIG. 14 is a schematic view showing the relationship between displacement in the return path of the balancer piston 27 according to a preferred embodiment of the present invention and the acceleration and contact force of the balancer piston 27. The accelerations of the balancer piston shown in FIG. 13 and FIG. 14 are accelerations of the balancer piston 27 in the direction perpendicular or substantially perpendicular to the inner wall surface 26a of the second cylinder 26. Also, the contact forces shown in FIG. 13 and FIG. 14 indicate magnitudes of the force of the balancer piston 27 to push the inner wall surface 26a of the second cylinder 26 in the direction perpendicular or substantially perpendicular to the inner wall surface 26a. In FIG. 14, the downward direction of the paper surface is the positive direction of the contact force and the acceleration of the balancer piston 27.

First, operations of the balancer piston 27 in the forward path will be described with reference to FIG. 11 and FIG. 13.

As shown in the upper portion of FIG. 13, in a state in which the balancer piston 27 is positioned at the top dead center (crank angle: 0 degrees), the left contact portion 27c of the balancer piston 27 is in contact with the left wall surface 26c of the second cylinder 26. In this state, when the crankshaft 24 is rotated in the arrow E direction (see FIG. 11), the engagement portion 24a of the crankshaft 24 is also rotated in the arrow E direction. Also, according to the rotation in the arrow E direction of the engagement portion 24a of the crankshaft 24, the engagement portion 28a of the rod 28 fitted to the engagement portion 24a starts to move to the upper left side of FIG. 11. The balancer piston 27 starts to tilt simultaneously with the start of movement of the engagement portion 28a of the rod 28. Then, the tilt angle of the balancer piston 27 increases with an increase in crank angle.

As shown in FIG. 13, the contact force becomes zero when the crank angle reaches T1. Also, the left contact portion 27c and the left wall surface 26c of the second cylinder 26 separate from each other when the crank angle reaches T1. Then, the crankshaft 24 is further rotated, and when the crank angle reaches T2, the acceleration of the balancer piston 27 greatly fluctuates. Also, when the crank angle reaches T2, the right wall surface 26b of the second cylinder 26 and the right contact portion 27b come into contact with each other, and the contact force increases. The balancer piston 27 moves toward the bottom dead center (crank angle: 180 degrees) while the right contact portion 27b slides on the right wall surface 26b.

Also, the tilt angle of the balancer piston 27 changes during sliding of the right contact portion 27b on the right wall surface 26b. In detail, as shown in the lower portion of FIG. 13, the tilt angle of the balancer piston 27 increases until the crank angle changes from T2 to 90 degrees, and thereafter, decreases while the balancer piston 27 moves toward the bottom dead center (crank angle: 180 degrees). Also, until the balancer piston 27 reaches the bottom dead center (until the crank angle reaches 180 degrees) after the right wall surface 26b and the right contact portion 27b come into contact with each other at the timing at which the crank angle reaches T2, the right contact portion 27b slides on the right wall surface 26b.

Next, operations of the balancer piston 27 in the return path will be described with reference to FIG. 12 and FIG. 14.

As shown in the lower portion of FIG. 14, in a state in which the balancer piston 27 is positioned at the bottom dead center (crank angle: 180 degrees), the right contact portion 27b is brought into contact with the right inner wall surface 26a of the second cylinder 26 by an inertial force of the balancer piston 27 in the forward path. From this state, when the crankshaft 24 is rotated in the arrow E direction of FIG. 12, the engagement portion 28a of the rod 28 fitted to the engagement portion 24a of the crankshaft 24 starts to move to the lower right side of FIG. 12. Also, the balancer piston 27 starts to tilt simultaneously with the start of movement of the engagement portion 28a of the rod 28. Then, the tilt angle of the balancer piston 27 increases with an increase in crank angle.

As shown in FIG. 14, the contact force becomes zero when the crank angle reaches T3. The right wall surface 26b and the right contact portion 27b separate from each other when the crank angle reaches T4. Also, the left wall surface 26c and the left contact portion 27c come into contact with each other when the crank angle reaches T4. The tilt angle of the balancer piston 27 when the left wall surface 26c and the left contact portion 27c come into contact with each other is different from the tilt angle of the balancer piston 27 when the right wall surface 26b and the right contact portion 27b come into contact with each other in the forward path.

After the left wall surface 26c and the left contact portion 27c come into contact with each other, the balancer piston 27 moves toward the top dead center while the left contact portion 27c slides on the left wall surface 26c. Also, the tilt angle of the balancer piston 27 changes during sliding of the left contact portion 27c on the left wall surface 26c. In detail, as shown in the upper portion of FIG. 14, the tilt angle of the balancer piston 27 increases until the crank angle changes from T4 to 270 degrees, and thereafter, decreases while the balancer piston 27 moves toward the top dead center (crank angle: 360 degrees).

Figure 15:
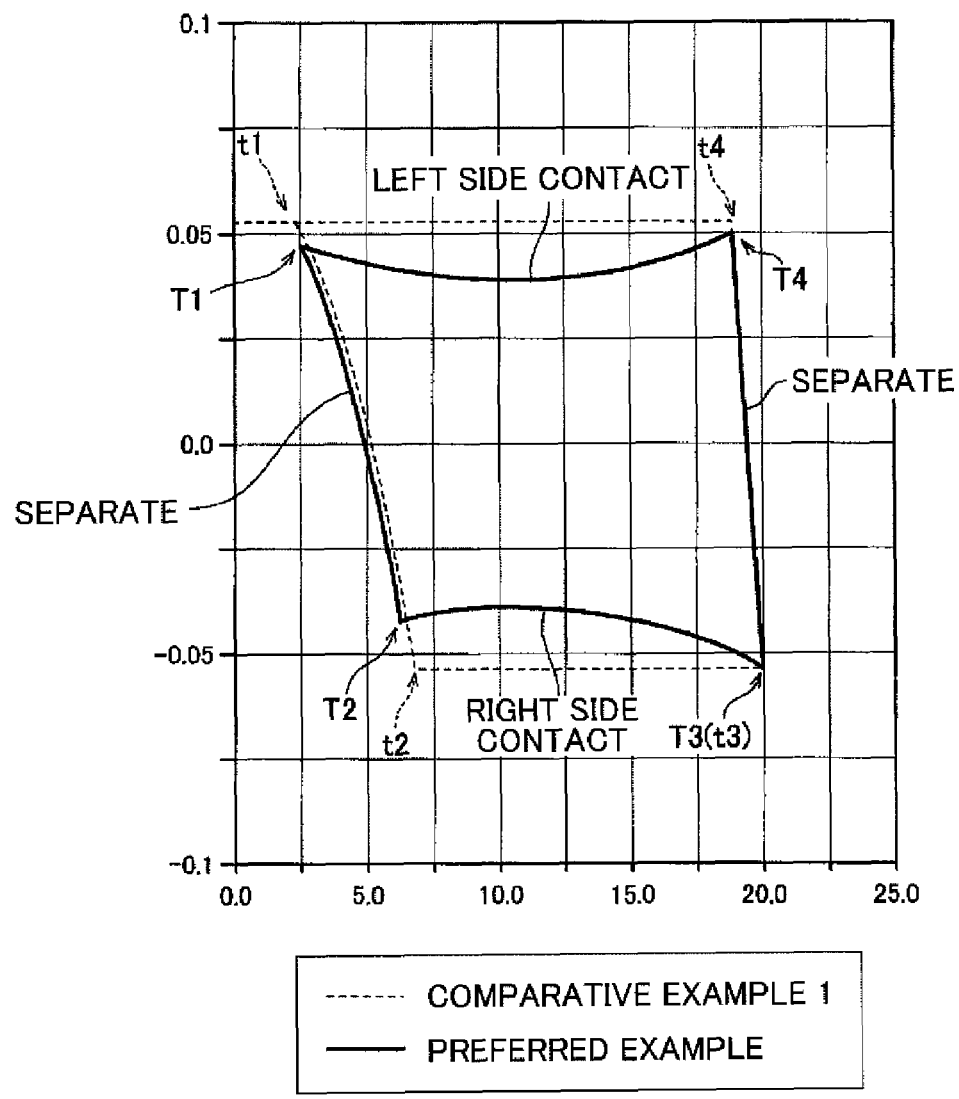
FIG. 15 is a view showing results of analysis on a locus of the center point of the balancer piston when the balancer piston is reciprocated.

FIG. 15 is a view showing results of analysis on a locus of the center point 27e of the balancer piston 27 when the balancer piston 27 is reciprocated.

The horizontal axis of FIG. 15 indicates the position of the center point 27e in the reciprocal motion direction of the balancer piston. The vertical axis of FIG. 15 indicates the position of the center point 27e in the direction perpendicular or substantially perpendicular to the reciprocal motion direction (X direction) of the balancer piston. The position of zero on the vertical axis of FIG. 15 indicates the central position (central position of the second cylinder 26) in the direction perpendicular or substantially perpendicular to the reciprocal motion direction (X direction) of the balancer piston.

The preferred example shown in FIG. 15 shows results of analysis when the surface of the outer peripheral portion 27a is formed along a circle (circle P centered on the point O1 of FIG. 5) with a radius of curvature R2 larger than the radius R1 of the maximum outer diameter portion 27d.

Also, the comparative example 1 shown in FIG. 15 shows results of analysis when the contact portion (the right contact portion and the left contact portion) is formed along a circle (circle Q1 centered on the point O2 of FIG. 5) with a radius of curvature equal to the radius R1 of the maximum outer diameter portion 27d.

As shown in FIG. 15, in the preferred example, after the left wall surface 26c and the left contact portion 27c separate from each other when the crank angle is T1, the right wall surface 26b and the right contact portion 27b come into contact with each other when the crank angle reaches T2. Thereafter, while the crank angle changes from T2 to T3, the right contact portion 27b slides on the right wall surface 26b, and when the crank angle reaches T3, the right wall surface 26b and the right contact portion 27b separate from each other. Then, when the crank angle reaches T4, the left wall surface 26c and the left contact portion 27c come into contact with each other, and while the crank angle changes from T4 to T1, the left contact portion 27c slides on the left wall surface 26c, and then when the crank angle reaches T1, the left wall surface 26c and the left contact portion 27c separate from each other. In the comparative example 1, t1, t2, t3, and t4 correspond to T1, T2, T3, and T4 of the preferred example, respectively.

The position of the center point 27e of the preferred example when the crank angle is T2 is closer to the central position of the second cylinder 26 than the position of the center point 27e of the comparative example 1 when the crank angle is t2. This shows that the distance between the right wall surface and the right contact portion in the non-contact state is smaller in the preferred example than in the comparative example 1, so that the timing at which the right wall surface and the right contact portion come into contact with each other is quicker in the preferred example than in the comparative example 1.

Similarly, the position of the center point 27e of the preferred example when the crank angle is T4 is closer to the central position of the second cylinder 26 than the position of the center point 27e of the comparative example 1 when the crank angle is t4. This means that the distance between the left wall surface and the left contact portion in the non-contact state is smaller in the preferred example than in the comparative example 1, so that the timing at which the left wall surface and the left contact portion come into contact with each other is quicker in the preferred example than in the comparative example 1.

Figure 16:
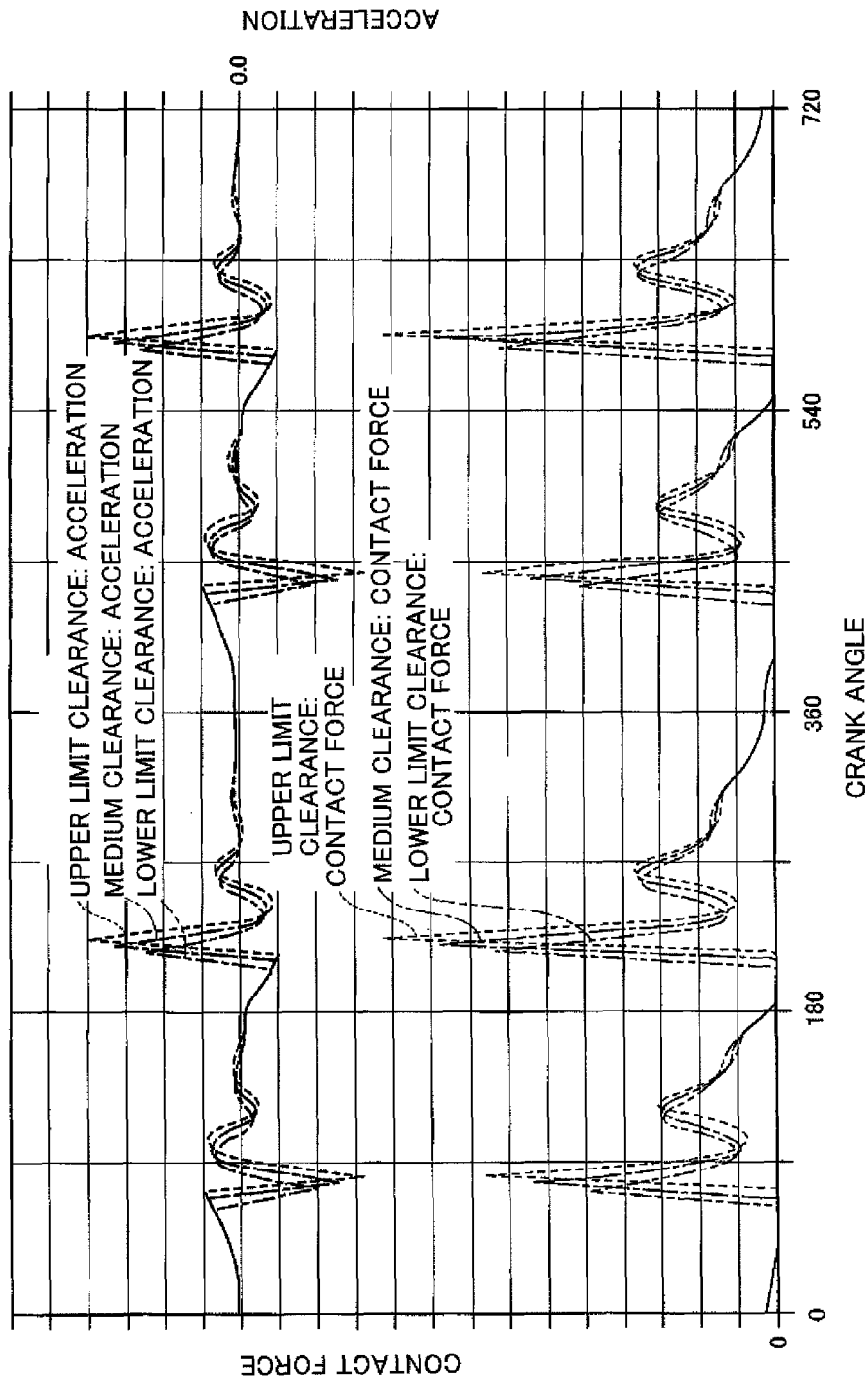
FIG. 16 is a view showing results of analysis for describing influence of the clearance between the balancer piston and the inner wall surface of the second cylinder on the acceleration and contact force of the balancer piston.

FIG. 16 shows results of analysis for describing influence of the clearance between the balancer piston 27 and the inner wall surface 26a of the second cylinder 26 on the acceleration and contact force of the balancer piston 27. FIG. 16 shows results of analysis in the cases where the size of the minimum clearance between the outer peripheral portion 27a of the balancer piston 27 in the non-tilt position and the inner wall surface 26a of the second cylinder 26 is an upper limit value, a medium value, and a lower limit value of a predetermined range.

As shown in FIG. 16, the acceleration and contact force of the balancer piston 27 becomes smaller in order as the size of the minimum clearance becomes the upper limit value, the medium value, and the lower limit value. Therefore, the acceleration and contact force of the balancer piston 27 become smaller as the minimum clearance becomes smaller, and the impact from contact of the balancer piston 27 with the inner wall surface 26a of the second cylinder 26 also becomes smaller as the minimum clearance becomes smaller. Therefore, the noise caused by the contact between the balancer piston 27 and the inner wall surface 26a of the second cylinder 26 becomes smaller as the minimum clearance becomes smaller. Thus, the influence of the size of the clearance between the outer peripheral portion 27a of the balancer piston 27 and the inner wall surface 26a of the second cylinder 26 on occurrence of noise is understood from the results of analysis shown in FIG. 16. Also, in FIG. 16, the reason why the timing (crank angle) at which the acceleration and contact force peak becomes quicker in order according to the lower limit value, the medium value, and the upper limit value is because the timing at which the balancer piston 27 comes into contact with the inner wall surface 26a of the second cylinder 26 becomes quicker as the minimum clearance becomes smaller.

FIG. 17 shows results of analysis for describing influence of the shape of the contact portion of the balancer piston on the acceleration and contact force of the balancer piston.

The preferred example shown in FIG. 17 shows results of analysis when the surface of the outer peripheral portion 27a of the balancer piston 27 is formed along a circle (circle P centered on the point O1 of FIG. 5) with a radius of curvature R2 larger than the radius R1 of the maximum outer diameter portion 27d.

The comparative example 1 shown in FIG. 17 shows results of analysis when the surface of the contact portion (the right contact portion and the left contact portion) is formed along a circle (circle Q1 centered on the point O2 of FIG. 5) with a radius of curvature equal to the radius R1 of the maximum outer diameter portion 27d.

Also, the comparative example 2 shown in FIG. 17 shows results of analysis when the surface of the contact portion is formed along a circle (circle Q2 centered on the point O3 of FIG. 5) with a radius of curvature R3 smaller than the radius R1 of the maximum outer diameter portion 27d.

The size (D3+D4) of the minimum clearance between the outer peripheral portion of the balancer piston in the non-tilt position and the inner wall surface of the second cylinder is the same among the preferred example, the comparative example 1, and the comparative example 2. In other words, the distance between the maximum outer diameter portion 27d in the non-tilt position and the inner wall surface 26a of the second cylinder 26 is the same among the preferred example, the comparative example 1, and the comparative example 2. Also, the minimum clearance (D5+D6) in the tilt position is smallest in the preferred example, and is second smallest in the comparative example 1.

As shown in FIG. 17, the acceleration and contact force is smallest in the preferred example, and is second smallest in the comparative example 1 in the forward path (crank angle: 0 to 180 degrees). Therefore, the acceleration and contact force become smaller as the radius of curvature becomes larger, and the impact from contact of the balancer piston with the inner wall surface 26a of the second cylinder 26 also becomes smaller as the radius of curvature becomes larger. Also, as shown in FIG. 17, the acceleration and contact force are not greatly different among the preferred example, the comparative example 1, and the comparative example 2 in the return path (crank angle: 180 to 360 degrees). This is attributed to the following reason.

That is, the tilt angle of the balancer piston (T4 of FIG. 14) when the outer peripheral portion 27a comes into contact with the inner wall surface 26a of the second cylinder 26 in the return path is smaller than the tilt angle of the balancer piston (T2 of FIG. 13) when the outer peripheral portion 27a comes into contact with the inner wall surface 26a of the second cylinder 26 in the forward path. Therefore, in the return path, the outer peripheral portion 27a and the inner wall surface 26a of the second cylinder 26 come into contact with each other at a position close to the maximum outer diameter portion 27d. Therefore, different from the forward path in which the outer peripheral portion 27a and the inner wall surface 26a of the second cylinder 26 come into contact with each other at a position distant from the maximum outer diameter portion 27d, in the return path, the size of the clearance is not greatly different among the preferred example, the comparative example 1, and the comparative example 2. Therefore, it is presumed that the acceleration and contact force did not greatly differ among the preferred example, the comparative example 1, and the comparative example 2 in the return path. In addition, the results of analysis were obtained under predetermined analysis conditions, and the results of analysis may become different as the analysis conditions such as the stroke of the balancer piston and the position of the center of gravity become different.

Next, technical effects and advantages of the balancer of the engine 2, the engine 2, and the outboard motor 1 according to a preferred embodiment of the present invention will be described by way of example, hereinafter.

In the present preferred embodiment, the distance from the center point 27e of the maximum outer diameter portion 27d to the contact start portion (right contact start portion 27g and the left contact start portion 27h) is larger than the radius R1 of the maximum outer diameter portion 27d. Therefore, the distance between the contact start portion and the inner wall surface 26a of the second cylinder 26 in the non-contact state becomes shorter than in the case in which the distance from the center point 27e of the maximum outer diameter portion 27d to the contact start portion is not more than the radius R1 of the maximum outer diameter 27d. Therefore, the transition period from the state (non-contact state) in which the balancer piston 27 is not in contact with the inner wall surface 26a of the second cylinder 26 to the state (contact state) in which the balancer piston 27 is in contact with the inner wall surface 26a of the second cylinder 26 becomes shorter. In other words, the timing at which the balancer piston 27 comes into contact with the inner wall surface 26a of the second cylinder 26 becomes quicker. Therefore, when the balancer piston 27 rocks toward the inner wall surface 26a of the second cylinder 26 while being accelerated by a force from the rod 28, the balancer piston comes into contact with the inner wall surface 26a of the second cylinder 26 before the acceleration in the direction perpendicular or substantially perpendicular to the inner wall surface 26a of the second cylinder 26 becomes higher. Therefore, the impact from contact of the balancer piston 27 with the inner wall surface 26a of the second cylinder 26 is minimized. Accordingly, the occurrence of noise is prevented.

In the present preferred embodiment, the clearance between the contact start portion in the tilt position and the inner wall surface 26a is smaller than the clearance between the maximum outer diameter portion 27d in the non-tilt position and the inner wall surface 26a. That is, the minimum clearance between the balancer piston 27 in the tilt position and the inner wall surface 26a of the second cylinder 26 is smaller than the minimum clearance between the balancer piston 27 in the non-tilt position and the inner wall surface 26a of the second cylinder 26. Accordingly, the timing at which the balancer piston 27 comes into contact with the inner wall surface 26a of the second cylinder 26 becomes still quicker. Therefore, the balancer piston 27 comes into contact with the inner wall surface 26a of the second cylinder 26 before the acceleration in the direction perpendicular or substantially perpendicular to the inner wall surface 26a of the second cylinder 26 becomes higher. Accordingly, the impact from contact of the balancer piston 27 with the inner wall surface 26a of the second cylinder 26 is minimized, and occurrence of noise is prevented.

As described with reference to FIG. 16, occurrence of noise is prevented by machining the outer peripheral portion 27a such that the size of the minimum clearance between the balancer piston 27 in the non-tilt position and the inner wall surface 26a of the second cylinder 26 becomes the lower limit value in FIG. 16. However, in this case, high machining accuracy for the outer peripheral portion 27a is required. On the other hand, when the clearance between the contact start portion in the tilt position and the inner wall surface 26a is smaller than the clearance between the maximum outer diameter portion 27d in the non-tilt position and the inner wall surface 26a, occurrence of noise is prevented regardless of the size of the minimum clearance in the non-tilt position. Therefore, in this case, without increasing the machining accuracy for the outer peripheral portion 27a, the occurrence of noise is prevented. Further, even if the size of the minimum clearance in the non-tilt position becomes larger in a predetermined range due to variation in machining accuracy, the occurrence of noise is prevented.

In the present preferred embodiment, the entire surface of the outer peripheral portion 27a is a curved surface in a section including the axis of the second cylinder 26. Therefore, the outer peripheral portion 27a comes into smooth contact with the inner wall surface 26a of the second cylinder 26. Accordingly, the occurrence of noise is further prevented.

Also, in the present preferred embodiment, the entire surface of the outer peripheral portion 27a is a curved surface including an arc with a radius of curvature R2 larger than the radius R1 of the maximum outer diameter portion 27d in a section including the axis of the second cylinder 26. Therefore, machining of the surface of the outer peripheral portion 27a becomes easier than in the case in which the surface of the outer peripheral portion 27a is a curved surface including a plurality of arcs with varied radiuses of curvature.

Although, preferred embodiments of the present invention are described above, the present invention is not limited to the contents of the preferred embodiments described above, and can be variously changed within the scope of the claims. For example, in the preferred embodiments described above, a case is described in which the surface of the contact portion (the right contact portion and the left contact portion) is preferably formed along an arc with a predetermined radius of curvature in a section including the axis of the second cylinder. However, the shape of the surface of the contact portion is not limited to this. For example, the surface of the contact portion may have a curvature which changes according to the location.

Also, in the preferred embodiments described above, a case is described in which not only a region on the side opposite to the crankshaft with respect to the maximum outer diameter portion but also a region on the crankshaft side with respect to the maximum outer diameter portion of the outer peripheral portion of the balancer piston preferably are formed along an arc with a predetermined radius of curvature. However, only the region on the side opposite to the crankshaft may be formed along an arc with a predetermined radius of curvature. That is, the portion which slides on the inner wall surface of the second cylinder of the outer peripheral portion of the balancer piston (right contact portion and left contact portion) is the region on the side opposite to the crankshaft with respect to the maximum outer diameter portion. Therefore, the region on the crankshaft side may have any shape.

In the preferred embodiments described above, a case is described in which the right contact portion and the left contact portion preferably have the same shape. However, the right contact portion and the left contact portion may have shapes different from each other. For example, the curvature of the surface of the contact portion which slides on the inner wall surface of the second cylinder in the return path may be made larger than the curvature of the surface of the contact portion which slides on the inner wall surface of the second cylinder in the forward path. In this case, the clearance between the contact portion in the return path and the inner wall surface of the cylinder becomes still smaller, so that the occurrence of noise in the return path is further prevented.

Also, in the preferred embodiments described above, a case is described in which the entire surface of the contact portion preferably is a curved surface. However, a portion of the surface of the contact portion may be formed to become a flat surface.

In the preferred embodiments described above, a case is described in which the present invention is applied to a balancer of an engine of an outboard motor. However, without limiting to a balancer of an engine of an outboard motor, the present invention is also applicable to balancers of other engines.

Also, in the preferred embodiments described above, a case is described in which two pairs of drive pistons and first cylinders are preferably provided. Further, in the preferred embodiments described above, a case is described in which one pair of a balancer piston and a second cylinder is preferably provided. However, the numbers of drive pistons and first cylinders to be paired may be one or three or more. Similarly, the numbers of balancer pistons and second cylinders to be paired may be two or more.

The present application corresponds to Japanese Patent Application No. 2009-1692 filed in the Japan Patent Office on Jan. 7, 2009, which application is incorporated in its entirety herein by reference.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A balancer for an engine including a crankshaft arranged to rotatably driven by reciprocal motion of a drive piston, the balancer comprising:
   a rod including a first end portion and a second end portion, the first end portion including a joining portion arranged to be joined to the crankshaft at a position that is eccentric relative to a rotation axis of the crankshaft, the second end portion arranged to reciprocate inside a cylinder including a cylindrical inner wall surface according to a rotation of the crankshaft; and
   a balancer piston fixed to the second end portion of the rod, the balancer piston arranged to reciprocate inside the cylinder so as to reduce vibrations caused by reciprocal motion of the drive piston, while rocking between a contact state in which the balancer piston is in contact with the inner wall surface and a non-contact state in which the balancer piston is separated from the inner wall surface according to the rotation of the crankshaft; wherein
   the balancer piston includes a cylindrical outer peripheral portion that is curved so as to expand towards the inner wall surface, the outer peripheral portion arranged such that lines of intersection with planes perpendicular or substantially perpendicular to a central axis of the balancer piston define circles, and such that there is a maximum outer diameter circle having a largest radius among the circles;
   the outer peripheral portion includes a contact portion which is arranged to come into contact with the inner wall surface, and the contact portion includes a contact start portion which is arranged to come into contact first with the inner wall surface when the balancer piston switches from the non-contact state to the contact state; and a distance from a center of the maximum outer diameter circle to the contact start portion is larger than the radius of the maximum outer diameter circle.

2. The balancer of an engine according to claim 1, wherein the balancer piston is arranged to assume a tilt position tilting with respect to an axis of the cylinder and a non-tilt position parallel to the axis of the cylinder when the balancer piston is in the non-contact state, and a minimum clearance between the outer peripheral portion in the tilt position and the inner wall surface of the cylinder is smaller than a minimum clearance between the outer peripheral portion in the non-tilt position and the inner wall surface of the cylinder.

3. The balancer of an engine according to claim 1, wherein at least the contact start portion and a vicinity thereof have a curved surface shape protruding to the inner wall surface side.

4. The balancer of an engine according to claim 3, wherein
the contact portion is arranged to change a portion which comes into contact with the inner wall surface of the cylinder according to a tilt angle of the balancer piston in the contact state, and to slide on the inner wall surface of the cylinder; and
a surface of the contact portion includes a curved surface including an arc with a predetermined radius of curvature larger than the radius of the maximum outer diameter circle in a section including the axis of the cylinder.

5. The balancer of an engine according to claim 4, wherein an entire surface of the outer peripheral portion is defined by a curved surface including an arc with the predetermined radius of curvature in a section including the axis of the cylinder.

6. An engine comprising:
a crankshaft;
a drive piston arranged to reciprocate inside a first cylinder, and to drive and rotate the crankshaft;
a rod including a first end portion and a second end portion, the first end portion including a joining portion arranged to be joined to the crankshaft at a position that is eccentric relative to a rotation axis of the crankshaft, the second end portion arranged to reciprocate inside a second cylinder including a cylindrical inner wall surface according to a rotation of the crankshaft; and
a balancer piston fixed to the second end portion of the rod, the balancer piston arranged to reciprocate inside the second cylinder so as to reduce vibrations caused by reciprocal motion of the drive piston, while rocking between a contact state in which the balancer piston is in contact with the inner wall surface and a non-contact state in which the balancer piston is separated from the inner wall surface according to the rotation of the crankshaft; wherein
the balancer piston includes a cylindrical outer peripheral portion that is curved so as to swell toward the inner wall surface, the outer peripheral portion arranged such that lines of intersection with planes perpendicular or substantially perpendicular to a central axis of the balancer piston define circles, and such that there is a maximum outer diameter circle having a largest radius among the circles;
the outer peripheral portion includes a contact portion which is arranged to come into contact with the inner wall surface, and the contact portion includes a contact start portion which is arranged to come into contact first with the inner wall surface when the balancer piston switches from the contact state to the non-contact state; and
a distance from a center of the maximum outer diameter circle to the contact start portion is larger than the radius of the maximum outer diameter circle.

7. An outboard motor arranged to rotate a propeller by a driving force of an engine, the engine comprising:
a crankshaft;
a drive piston arranged to reciprocate inside a first cylinder, and to drive and rotate the crankshaft;
a rod including a first end portion and a second end portion, the first end portion including a joining portion arranged to be joined to the crankshaft at a position that is eccentric relative to a rotation axis of the crankshaft, the second end portion arranged to reciprocate inside a second cylinder having a cylindrical inner wall surface according to a rotation of the crankshaft; and
a balancer piston fixed to the second end portion of the rod, the balancer piston arranged to reciprocate inside the second cylinder so as to reduce vibrations caused by reciprocal motion of the drive piston, while rocking between a contact state in which the balancer piston is in contact with the inner wall surface and a non-contact state in which the balancer piston is separated from the inner wall surface according to the rotation of the crankshaft; and
the balancer piston includes a cylindrical outer peripheral portion that is curved so as to expand toward the inner wall surface, the outer peripheral portion arranged such that lines of intersection with planes perpendicular or substantially perpendicular to a central axis of the balancer piston define circles, and such that there is a maximum outer diameter circle having a largest radius among the circles;
the outer peripheral portion includes a contact portion which is arranged to come into contact with the inner wall surface, and the contact portion includes a contact start portion which is arranged to come into contact first with the inner wall surface when the balancer piston switches from the non-contact state to the contact state; and
a distance from a center of the maximum outer diameter circle to the contact start portion is larger than the radius of the maximum outer diameter circle.

* * * * *